Jan. 7, 1941.  W. RUNGE ET AL  2,228,064
ULTRA SHORT WAVE SYSTEM
Filed July 27, 1940  2 Sheets-Sheet 1
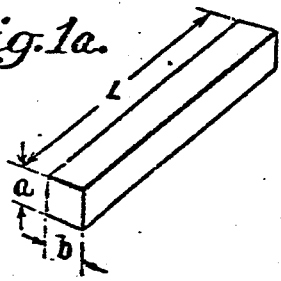
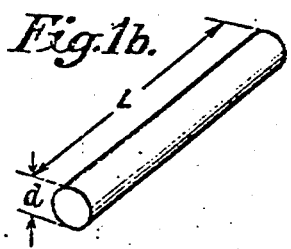
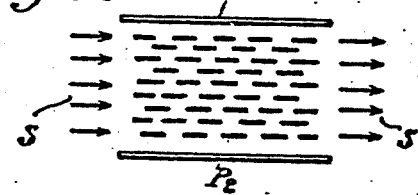
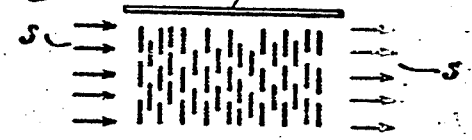
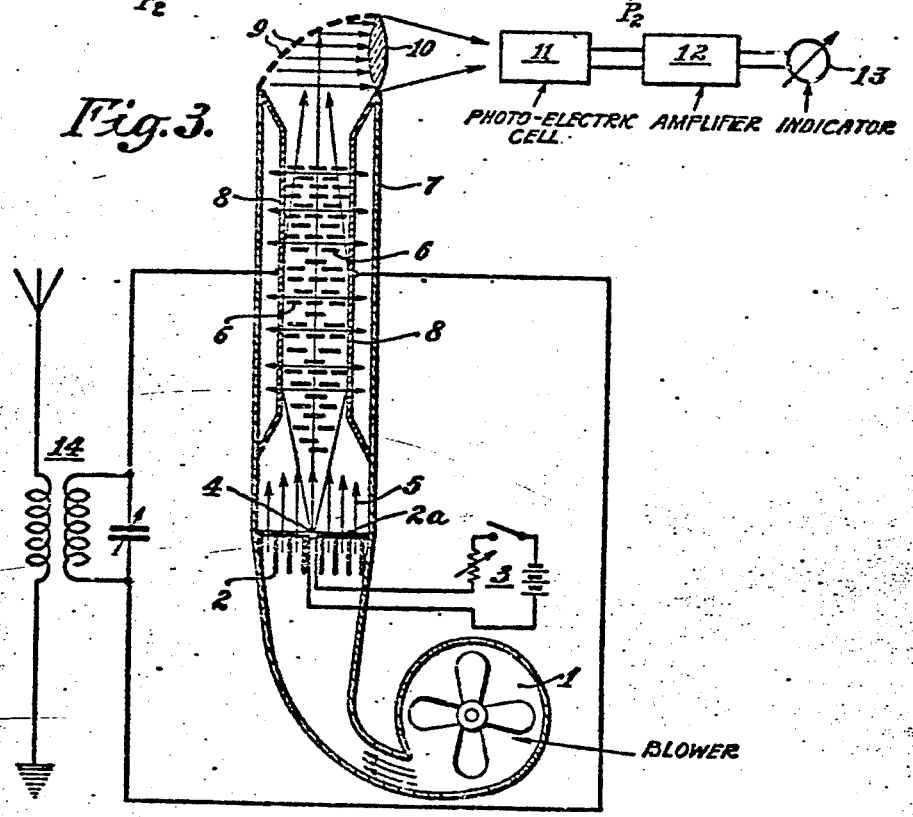
INVENTORS
Wilhelm Runge, Hans Otto Roosenstein and Werner Fogy
BY H. S. Grover
ATTORNEY Jan. 7, 1941.     W. RUNGE ET AL     2,228,064
ULTRA SHORT WAVE SYSTEM
Filed July 27, 1940     2 Sheets-Sheet 2
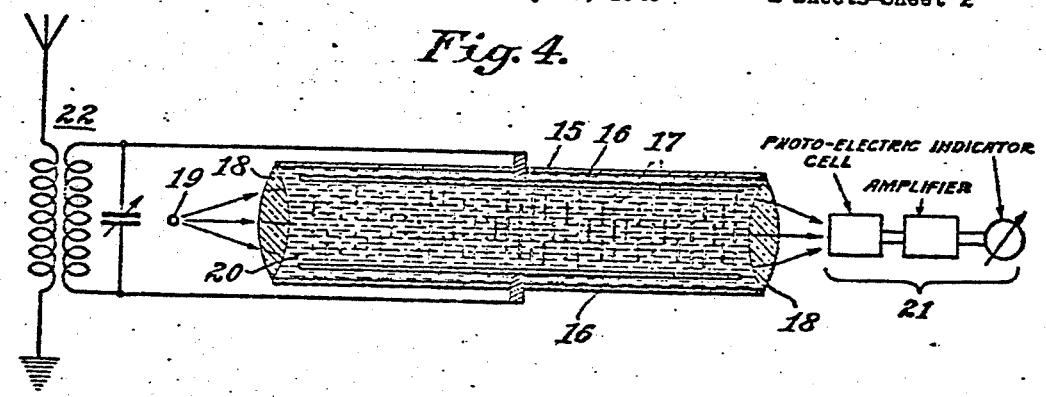
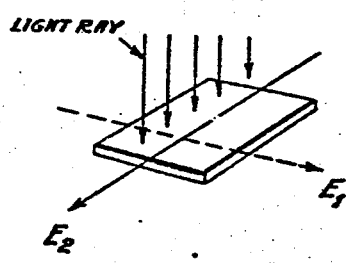
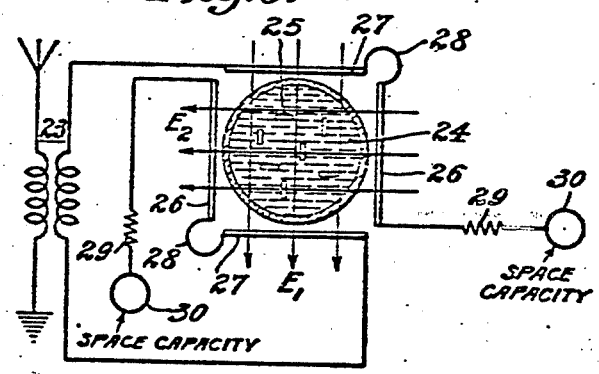
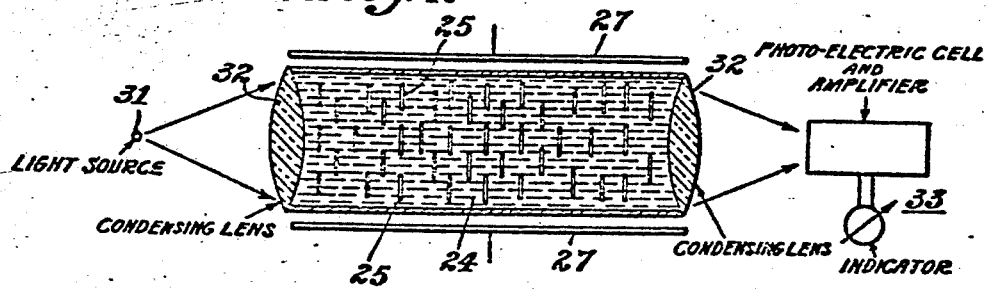
INVENTORS
Wilhelm Runge, Hans Otto Roosenstein and
Werner Fogy
BY
ATTORNEY Patented Jan. 7, 1941

2,228,064

UNITED STATES PATENT OFFICE 2,228,064

ULTRA SHORT WAVE SYSTEM

Wilhelm Runge, Hans Otto Roosenstein, and Werner Fogy, Berlin, Germany, assignors to Telefunken Gesellschaft für Drahtlose Telegraphie m. b. H., Berlin, Germany, a corporation of Germany Application July 27, 1940, Serial No. 347,832
In Germany February 17, 1939

7 Claims. (Cl. 250—21)

This invention is concerned with an arrangement adapted to receive electromagnetic waves, especially ultra short waves, centimeter and millimeter waves.

The invention is predicated upon a principle which by novel ways and means is suited for the demodulation of electromagnetic waves modulated by signals. The principle is that metallic chips of suitable shape distributed inside a space are directionalized or oriented by the incoming radio frequency field, with the result that the passage and transmission of light through the space containing the particles is influenced. The particles, however, must be protected against gravity in this space in order to prevent them from settling all at the bottom. This end is attainable by impressing them with a direct current voltage and by maintaining them in a state of suspension in a direct current electric field. Instead of that the particles could also be kept in suspension inside a medium of suitable density or by the aid of a laminate stream of a suitable medium such as air.

According to the purpose and practical use (whether for telegraphy on any desired waves at all, broadcast, television, etc.), a lower adjusting period of the particles will be demanded in order that they may follow variations of radio frequency amplitude. Moreover, the particles should not adjust themselves in an oscillatory way by action of the signal or incoming field; in fact the damping effect of the medium or ambient must be so chosen that the adjustment proceeds in the aperiodic limiting case. Once a particle has become set or adjusted, and if the incoming field is equal to zero, then the particles will be restored again to their most probable receiving position by such static, hydrodynamic or Brownian forces as may prevail within the medium or ambient. In order that this may be accomplished inside a correspondingly brief period of time, the particles must be of suitable smallness.

Metallic chips or fragments or splinters of high-conducting material or an insulator with a high dielectric constant are used for the reason that the particles are devoid of natural or inherent electrical moment and that, indeed, they become dipoles only when immersed in a radio frequency field by virtue of influence effect. In other words, the electrical moment of such a splinter is a function of the incoming or signal field intensity.

The following describes a number of arrangements adapted to carry the basic idea of the invention into practice. The exemplified embodiments to be described are divided according to the form of the particles and the means and the manner of eliminating the action of gravity upon the particles.

In the drawings, Figs. 1a and 1b and 5 illustrate shapes of particles which can be used in the practice of the invention; Figs. 2a and 2b are given to aid in an understanding of the basic principles involved; Figs. 3, 4 and 6 illustrate different embodiments of the invention; and Fig. 7 is a side view of the embodiment of Fig. 6.

If the particles have the shape of oblong crystals (Fig. 1), then these rodlets will have their longitudinal axis directed or directionalized in the sense of the field. To calculate the problem, the assumption shall be made that the dimensions $a$ and $b$ (or $d$ for round rodlets) are very small in contrast to the length L.

Referring to Fig. 2, (a) illustrates the distribution of the particles in the absence of a signal or incoming field. Between the plates $P_1$ and $P_2$ the particles in some convenient manner have been caused to assume positions parallel to the planes of the plates. If, then, a radio frequency field is applied to the plates $P_1$ and $P_2$, or if rays or radiations of suitable polarity be transmitted between the plates, the assembly of particles assumes a state as shown in Fig. 2b; in other words, the particles assume positions at right angles with an incidental reduction of the light ray pencil S. The angle of rotation of the particles is a function of the intensity of the radio frequency field.

Figs. 3 and 4 illustrate two different arrangements according to the invention. Referring to Fig. 3, it will be seen that 1 is a fan or blower, 2 a device adapted to produce a laminate air current, 2a a fine mesh sieve, 3 the circuit means for the light-source, and 4 the light source. The arrows 5 indicate the laminate form of the air current, 6 the particles, 7 the envelope of cylindrical form consisting of insulation material, 8 are the electrodes, 9 the reflector particles forming a grate, 10 the condensing lens, 11 the photo-electric cell, 12 the amplifier, 13 the indicator device and 14 the antenna circuit. The particles float in a gas current of laminate or sheet form. The light source is attached below to a sieve, and the light-rays are reflected from the tiny mirrors 9 into the lens 10 in such a way that they fall upon a photo-electric cell and an indicator device; say, a loud-speaker, a telephone receiver or a telegraphic instrument.

In an arrangement of the kind shown in Fig. 4, the cylinder is placed in a horizontal position and the particles are held in a state of suspension within a medium of suitable density and viscosity. The reference numerals in Fig. 4 are as follows: 15 is the insulation case, 16 the electrodes, 17 the particles, 18 the condensing lens, 19 the source of light, 20 the medium in which the particles are caused to float, 21 the photo-electric cell including amplifier and indicator device, and 22 stands for the antenna circuit.

If the particles are in the form of foliations or scales (as illustrated in Fig. 5) so that two of their dimensions are large compared with the third, it will be readily understood that a single field direction is inadequate to direct or adjust the particles so that they assume a clearly defined position. The demand is that the particle inside a radio frequency field should have its plane placed at right angles to the light ray pencil, though in practice innumerable other positions may occur. In order to prevent this it is necessary to cause another field to act at right angles to the field $E_1$, the said additional field being indicated at $E_2$ and being of the same intensity. Thus, if both fields are allowed to act at the same time in full intensity there results again only one field direction, namely, the resultant of $E_1$ and $E_2$, and therefore only one acting force. The fields $E_1$ and $E_2$, therefore, should not act simultaneously, but they must be shifted or be apart a period $\tau$ and a phase angle equal to $\pi/2$. Period $\tau$ must be small in contrast to the time of adjustment $T$ of the particles, and the inertia of the particles must be suitably chosen lest the particles rotate in the rotary electric field of $E_1$ and $E_2$. However, if the inertia, the damping and period $\tau$ are properly attuned, the particles will be unable to partake of the rotation; indeed, they will be compelled to have their two particular or characteristic directions adjusted to the major plane given and governed by the two directions of the fields. If the light flux is allowed to impinge normally to this major plane, a certain part of the light will be blocked. Fig. 6 shows schematically an arrangement by which this condition is obtainable.

Referring to Fig. 6, 23 is the antenna, 24 the medium or ambient, 25 the particles, 26 and 27 the pairs of electrodes, 28 the phase and transit time loop, 29 the resistance, 30 the space capacities, 31 the light source, 32 the condensing lenses, 33 the photo-electric cell, amplifier and indicator.

The radio frequency rotary field is set up by two pairs of electrodes which are fed so that there results a certain suitable phase displacement angle. Each plate pair has at its end a space capacity. As to the rest, the arrangement is the same as that in Fig. 4.

Fundamentally speaking, it is possible also to use the magnetic component of the incoming or signal field for such directionalizing purposes, though in that case the particles must be ferromagnetic in nature. Generally speaking, this rule may be laid down that the adjusting period $T$ will be so much higher or greater, the stronger the incoming field intensity. The particles, of course, must be opaque to light, while the medium or ambient must be permeable to light. In order that no disturbing diffraction effects may happen, the wavelength of the transmitted light must be small in contrast with the dimensions of the particles.

Instead of a radio frequency rotary field for the adjustment of the laminate or foliate particles or scales, recourse could be had also to a linear field and a direct current field at right angles thereto. However, in this instance a biasing potential must be impressed on the particles.

The invention is not confined to the exemplified embodiments herein shown, indeed it resides essentially in this fact that variations of radio frequency amplitude of an incoming or signal field are converted into light variations by causing the signal field to act upon minute particles and to impose upon these particles an orientation in space which differs from the position of equilibrium of the particles. The nature of the particles as well as the particular form of arrangement is immaterial so far as the said broad and general idea underlying the invention is concerned. The size of the particles may be as small as down to molecular dimensions.

What is claimed is:

1. In an ultra short wave system, a container having uniformly suspended therein in a light permeable medium a multiplicity of minute orientable particles of high dielectric constant, a source of light at one end of said container for emitting rays of light which impinge upon said medium, a utilization circuit at the other end of said container for receiving the light rays passing through said medium, a pair of spaced electrodes intermediate the ends of said container and substantially on opposite sides of said medium, and means for applying radio frequency signal energy to said electrodes for affecting the orientation of said particles.

2. In an ultra short wave system, a container having uniformly suspended therein in a light permeable medium a multiplicity of minute orientable particles of high dielectric constant, a source of light at one end of said container for emitting rays of light which impinge upon said medium, a utilization circuit at the other end of said container for receiving the light rays passing through said medium, a pair of spaced electrodes intermediate the ends of said container and substantially on opposite sides of said medium, means for applying radio frequency signal energy to said electrodes for affecting the orientations of said particles, and means for maintaining said particles in a state of suspension in said medium.

3. In an ultra short wave system, a container having uniformly suspended therein in a light permeable medium a multiplicity of minute orientable opaque particles of asymmetric contour, a source of light at one end of said container for emitting rays of light which impinge upon said medium, a utilization circuit at the other end of said container for receiving the light rays passing through said medium, a pair of spaced electrodes intermediate the ends of said container and substantially on opposite sides of said medium, and means for applying radio frequency signal energy to said electrodes for affecting the orientation of said particles.

4. In an ultra short wave system, a container having uniformly suspended therein in a light permeable medium a multiplicity of minute orientable opaque metallic particles of asymmetric contour, a source of light at one end of said container for emitting rays of light which impinge upon said medium, a utilization circuit at the other end of said container for receiving the light rays passing through said medium, a pair of spaced electrodes intermediate the ends of said container and substantially on opposite sides of said medium, means for applying radio frequency signal energy to said electrodes for affecting the orientation of said particles, and means including a unidirectional field for maintaining said particles in a state of suspension in said medium.

5. In an ultra short wave system, a container having uniformly suspended therein in a light permeable medium a multiplicity of minute orientable rod-like opaque particles, a source of light at one end of said container for emitting rays of light which impinge upon said medium, a photoelectric cell in light coupling relation to the other end of said container for receiving the light rays passing through said medium, a pair of spaced electrodes intermediate the ends of said container and substantially on opposite sides of said medium, and means for applying radio frequency signal energy to said electrodes for affecting the orientation of said particles.

6. In an ultra short wave system, a container having a light permeable medium in which are suspended a multiplicity of minute orientable opaque particles of asymmetric contour, a source of light at one end of said container for emitting rays of light which impinge upon said medium, a mirror at the other end of said container for receiving the light rays passing through said medium, said mirror being arranged to reflect the light impinging thereon at an angle to the longest dimension of said container, means for applying a radio frequency field to said particles for altering the position thereof, a photoelectric cell for receiving the light reflected from said mirror, an amplifier coupled to said photoelectric cell, and an indicator coupled to the output of said amplifier, whereby the variations in intensity of the light impinging upon said cell serve to indicate the variations in said radio frequency field.

7. In an ultra short wave system, a container having a light permeable medium in which are suspended a multiplicity of minute orientable opaque particles of asymmetric contour, a source of light at one end of said container for emitting rays of light which impinge upon said medium, means for applying a radio frequency field to said particles for altering the position thereof, a photoelectric cell in light coupling relation to the other end of said container, an amplifier coupled to said photoelectric cell, and an indicator coupled to the output of said amplifier, whereby the variations in intensity of the light impinging upon said cell serve to indicate the variations in said radio frequency field.

WILHELM RUNGE.
HANS OTTO ROOSENSTEIN.
WERNER FOGY.